J. G. BECKER.
AUTOMOBILE LIGHT SHIFTER.
APPLICATION FILED JAN. 30, 1913.
1,072,418.
Patented Sept. 9, 1913.
2 SHEETS—SHEET 2.
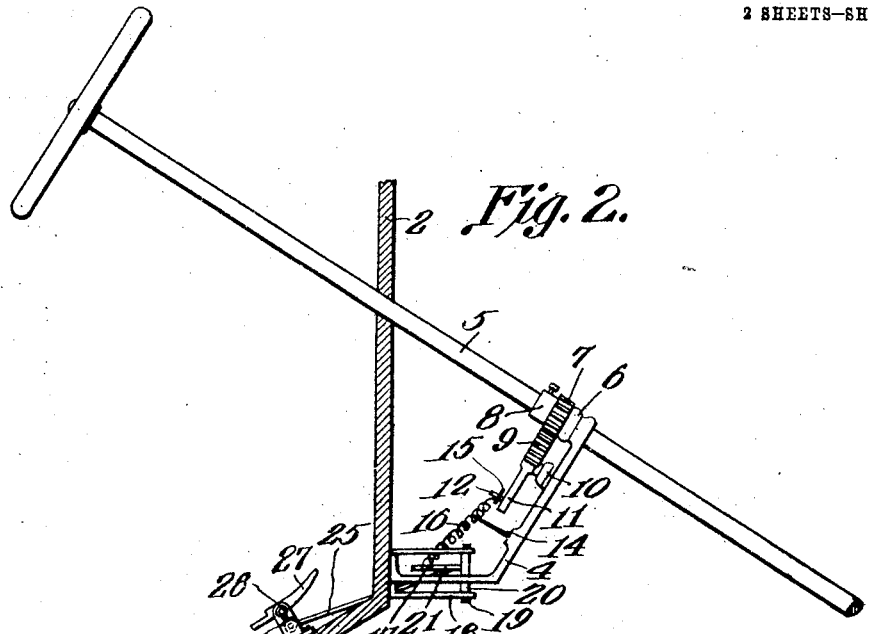
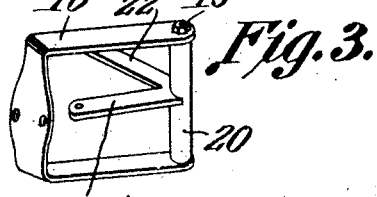
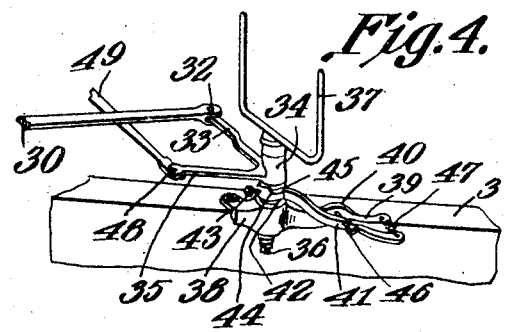
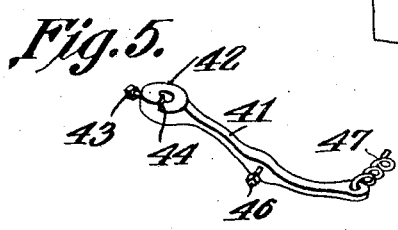
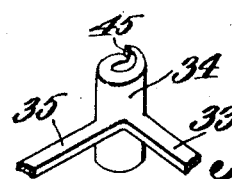
John G. Becker, Inventor

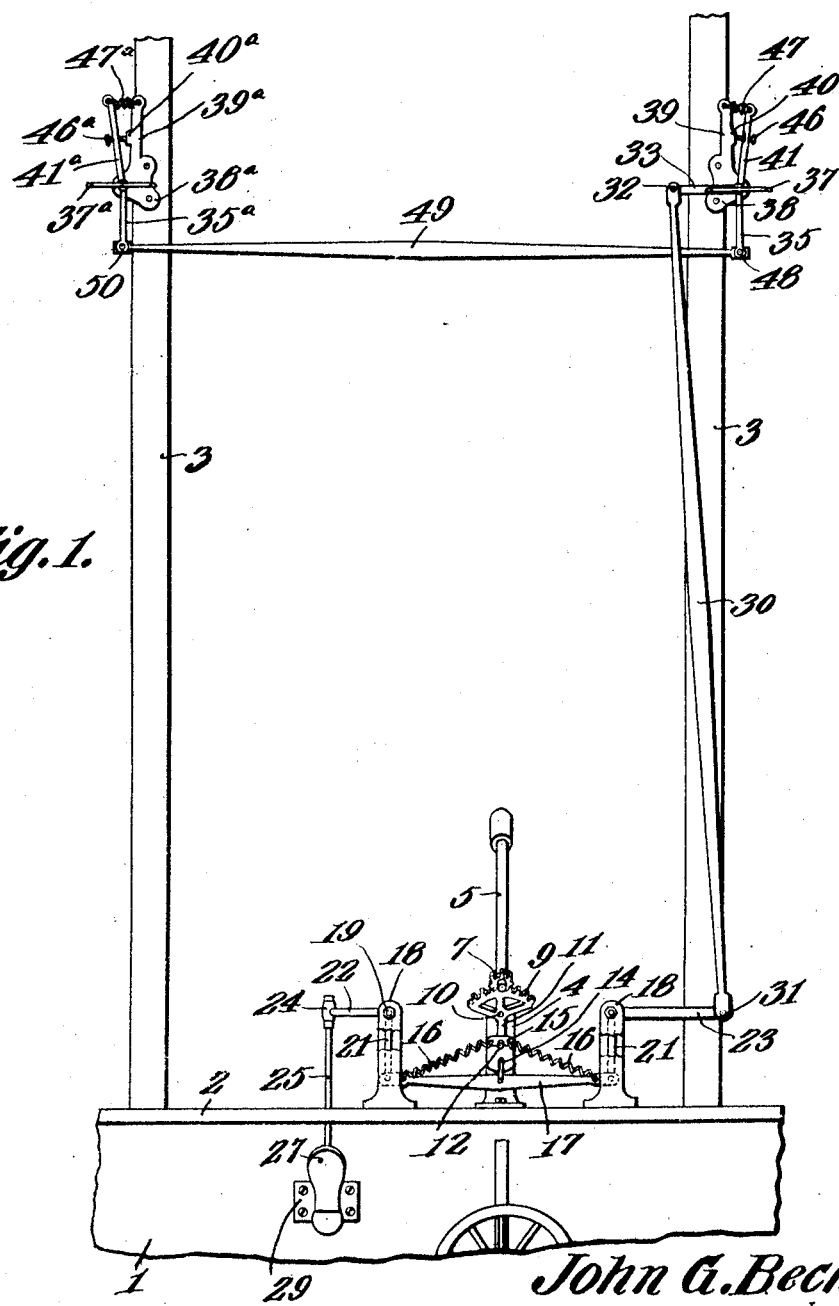

UNITED STATES PATENT OFFICE.

JOHN G. BECKER, OF CAMPBELL, MISSOURI.

AUTOMOBILE LIGHT-SHIFTER.

1,072,418.   Specification of Letters Patent.   Patented Sept. 9, 1913.

Application filed January 30, 1913. Serial No. 745,258.

*To all whom it may concern:*

Be it known that I, JOHN G. BECKER, a citizen of the United States, residing at Campbell, in the county of Dunklin and State of Missouri, have invented a new and useful Automobile Light-Shifter, of which the following is a specification:

The device forming the subject matter of this application, is adapted to be employed upon an automobile or like structure, for shifting the lamps of the automobile, as the vehicle rounds a curve or turns a corner.

One object of the present invention is to provide novel means whereby the lamps may be turned either from the steering wheel shaft or by independent means under the control of the operator of the car.

Another object of the invention is to provide novel means whereby but one lamp at a time may be turned, said lamp being turned outwardly.

It is within the scope of the invention to improve generally and to increase the utility of devices of that type to which the present invention appertains.

With the foregoing and other objects in view, which will appear as the description proceeds, the invention resides in the combination and arrangement of parts and in the details of construction hereinafter described and claimed, it being understood that changes in the precise embodiment of invention can be made within the scope of what is claimed without departing from the spirit of the invention.

In the drawing:—Figure 1 shows the invention in top plan; Fig. 2 is a side elevation of that portion of the mechanism which is located adjacent the steering wheel of the automobile; Fig. 3 is a perspective showing one of the actuating bell cranks and the support therefor; Fig. 4 is a perspective showing that portion of the mechanism which is located adjacent the lamp bracket; Fig. 5 is a perspective of the spring controlled arm whereby the lamp, having been swung outwardly, is returned to a position parallel to the line of advance of the vehicle; and Fig. 6 is a perspective of a bell crank which coöperates with the element shown in Fig. 5.

In the drawing, the numeral 1 indicates the foot board of a motor propelled vehicle, the numeral 2 indicating the dash board and the numeral 3 indicating the chassis. Secured to the dash board 2 and projecting forwardly therefrom is a bearing bracket 4 in which the steering shaft 5 is journaled, the steering shaft 5 being provided with an abutment 6, receiving a pinion 7, held in place by a collar 8. The pinion 7 meshes into another pinion which may take the form of a segment 9, mounted to swing on a shaft 10 projecting from the bearing bracket 4, the segment 9 being provided with a depending arm 11, carrying a supporting pin 12. There is another pin 14 upon the bracket 4, the pins 12 and 14 coöperating in a manner which will be set forth hereinafter.

Mounted removably upon the pin 12 which is carried by the segment 9 is a plate 15, to the ends of which are secured retractile springs 16, the outer ends of the springs 16 being united with the ends of a connecting rod 17. Brackets 18 are secured to the dash board 2, the brackets 18 supporting upright shafts 19 upon which are journaled hubs 20 provided with rearwardly extended arms 21 to which the extremities of the connecting rod 17 are pivotally united. The hubs 20 carry other arms denoted separately by the reference characters 22 and 23, the arms and the hubs constituting bell cranks fulcrumed upon the brackets 18.

The arm 22 of one bell crank is united by means of universal joint 24 with a rearwardly extended pitman 25 pivoted to the lower end of an extension 26 formed upon a pedal 27, fulcrumed upon a shaft 28 supported terminally by the upstanding arms of a standard 29 which is secured to the foot board 1. A connecting rod 30 is pivoted at its rear end as indicated at 31 to the arm 23 of the other bell crank. The forward end of the connecting rod 30 is pivoted as shown at 32 to an arm 33 projecting from a hub 34, the hub 34 being provided with an angularly disposed arm 35 which extends rearwardly. The hub 34 is mounted to rotate upon a shaft 36, carrying a lamp support 37, the shaft 36 being journaled in a bracket 38 which is secured to the chassis 3. The bracket 38 is equipped with a forwardly extended arm 39 having an upstanding lug 40.

The invention further includes an arm 41 provided with a head 42 receiving the shaft 36; the head 42 being held upon the shaft 36 by means of a set screw 43. Since the arm 41 is held upon the shaft 36 by means of the set screw 43, the shaft 36, the arm 41 and the lamp support 37 which is attached to the upper end of the shaft 36 constitute a structure which, for convenience in description, may be designated as a "lamp holder." The head 42 is equipped with a shoulder 44 coöperating with a shoulder 45 formed on the lower end of the hub 34. The hub 34 and the head 42, as clearly shown, respectively, in Figs. 6 and 5 are provided with spiral end faces, resulting in the formation of the shoulders above referred to. Owing to the construction above pointed out, the head 42 and the hub 34 have large terminal bearing areas, wear being thereby distributed over relatively large areas. It is obvious, owing to the construction above described, that the hub 34 must have a slight endwise movement upon the shaft 36, this movement being very small but being sufficient to permit the shoulders 45 and 44 to coact. A set screw 46 is threaded in the intermediate portion of the arm 41, the set screw 46 being adapted to engage with the lug 40 of the bearing 38. A retractile spring 47 unites the forward end of the arm 41 with the forward end of the extension 39 of the bracket 38. Pivoted as shown at 48 to the rear end of the arm 35 is a cross rod 49.

The structure shown in Figs. 4, 5 and 6, and located upon the right hand side of the vehicle frame is duplicated upon the left hand side of the vehicle frame, saving for the fact that the arm 33, hereinbefore described is omitted. In Fig. 1 of the drawing, the elements which are located upon the left hand side of the vehicle frame are indicated by the suffix "a" and the left hand end of the cross rod 49 is pivoted as shown at 50 to the rear end of the rearwardly extended arm 35ª.

It will be understood that ball bearings or like anti-friction elements may be employed wherever necessary. In order to simplify the drawings, and to shorten the description, no mention has been made of anti-friction bearings but any skilled mechanic, with the present disclosure before him, will be entirely competent to make the required changes along this line, without departing from the spirit of the invention.

In practical operation, when the steering shaft 5 is rotated, rotatory movement will be transmitted to the pinion 7 and thence to the segment 9. The segment 9, swinging upon its fulcrum 10 will, through the medium of the springs 16, impart movement to the connecting rod 17, motion thus being transmitted to the bell crank comprising the hub 20 and the arms 21 and 23, located at the right hand side of the vehicle, the rod 30 being actuated. When the rod 30 is pushed forwardly, the hub 34 will be rotated through the medium of the arm 33, the hub 34 turning upon the lamp shaft 36. When the hub 34 is rotated in this manner to the right, the shoulder 45 on the hub 34 will engage with the shoulder 44 of the arm 41, the arm 41 being fixed to the lamp shaft 36. In this manner, the lamp support 37 will be rotated outwardly, and to the right. When the arm 41 is swung, the spring 47 will be put under tension, the spring 47 constituting a means for swinging the free end of the arm 41 toward the chassis, and for restoring the right hand support 37 to its original position. The set screw 46 which is threaded into the arm 41 is adapted to engage with the lug 40, on the extension 39 of the bearing 38. Owing to the coöperation of the parts last above described, the movement of the lamp support 37, under the actuation of the spring 47, will be limited, so that the lamp will point straight ahead. Obviously, the set screw 46 constitutes a means for adjusting the position of the right hand lamp support, so that the lamp carried thereby will normally face directly to the front.

Suppose that a rearward pull has been imparted to the rod 30. Then the hub 34 will be rotated upon the lamp shaft 36. The right hand lamp support 37, however, will not be swung inwardly, toward the center of the vehicle, because, when the hub 34 is rotated in the manner hereinbefore described, the shoulder 45 of the hub 34 will move away from the shoulder 44 of the arm 41 which is secured to the lamp shaft 36. Under the circumstances above pointed out, the arm 35 will impart movement to the cross rod 49, the lamp swinging mechanism upon the left hand side of the vehicle being operated in the manner hereinbefore set forth. The lamp support 37, therefore, is adapted to swing outwardly, to follow the curve the vehicle is taking, but is not adapted to swing inwardly, the lamp supports being selectively actuable to swing outwardly and to follow the curve or angle which the vehicle is taking.

In the foregoing operation it has been presupposed that the lamps are manipulated through the medium of the steering shaft 5. If desired, however, the foot of the operator may be placed upon the pedal 27, the extension 26 of which will actuate the pitman 25, the latter, through the medium of the universal joint 24 tilting the left hand bell crank comprising the arm 22 and associated parts, motion being thus transmitted into the connecting rod 17 and thence, by way of the right hand bell crank including the arm 23, into the connecting rod 30, as hereinbefore described. Owing to the fact that the rod 17 is yieldably connected to the segment 9 through the medium of the springs 16, the rod 30 may be actuated from the pedal 27, independently of the steering shaft 5.

During the day time, and whenever it is desired not to rotate the lamp supports 37, the plate 15 which connects the upper ends of the springs 16 may be detached from the pin 12 which is carried by the arm 11 of the segment 9, the plate 15 being then suspended upon the pin 14 which is carried by the bearing bracket 4. Thereupon, the steering shaft 5 may be manipulated freely without turning the lamps.

The lamp supports 37, the shafts 36, and the arms 41 may be referred to collectively as lamp holders. The shoulders 45 and 44 constitute interengaging elements for rotating the shafts 36 and the supports 37.

Having thus described, the invention, what is claimed is:—

1. In a device of the class described, rotatable lamp holders; means for limiting the inward rotation of the holders beyond predetermined points; members rotatable upon the holders; a connection uniting the said members; interengaging elements upon the said members and on the holders; for imparting outward rotation to the holders separately; and means for actuating the connection.

2. In a device of the class described, rotatable lamp holders; means for limiting the inward rotation of the holders beyond a predetermined point, said means comprising coöperating elements, one of which is fixed and the other of which is adjustable to position the holders with respect to the line of travel; yieldable means for actuating the holders to cause said elements to coöperate; members rotatable upon the holders; a connection between the said members; interengaging elements on the said members and the holders for imparting outward rotation to the holders separately; and means for actuating the connection.

3. In a device of the class described, a bracket; a lamp support including a shaft journaled in the bracket; an arm secured to the shaft and constituting a means for upholding the shaft upon the bracket; a hub mounted for rotation on the shaft, above the arm, and adapted to slide longitudinally of the shaft; interengaging shoulders upon the hub and upon the arm, adapted to swing the arm and the shaft outwardly when the hub is actuated; a screw threaded into the arm and adapted to abut against the bracket; a retractile spring connecting the arm with the bracket; and means for actuating the hub.

4. In a device of the class described, a steering shaft; intermeshing pinions, one of which is located upon the steering shaft, the other of which is supported independently of the shaft, for rotation; a rod mounted to move transversely of the steering shaft; a yieldable connection between the last specified pinion and the rod; a rotatably mounted lamp support; and means for connecting the rod with the lamp support.

5. In a device of the class described, a steering shaft; a pedal; a movably mounted member; means for operatively connecting the movably mounted member with the pedal; means for operatively connecting the movably mounted member with the steering shaft, said means including a yieldable element adapted to permit the movably mounted member to be actuated by the pedal, independently of the steering shaft; a movable lamp support; and an operative connection between the lamp support and the movably mounted member.

6. In a device of the class described, bell cranks; means for supporting the bell cranks; a rod connecting the bell cranks at one end; a pedal; means for operatively connecting the pedal with the other end of one bell crank; a lamp support; means for operatively connecting the lamp support with the other end of the other bell crank; a rotatably mounted steering shaft; a movably mounted member; and means for operatively connecting the movably mounted member with the steering shaft, said means including a yieldable element permitting the actuation of the movably mounted member from the pedal, independently of the steering shaft.

7. In a device of the class described, levers; means for supporting the levers for swinging movement; a connection between the levers; a pedal operatively connected with one lever; a lamp support; means for operatively connecting the lamp support with the other lever; a steering shaft, and means for operatively connecting the steering shaft with the first named connection, said means including a yieldable element, permitting an actuation of the first named connection by the pedal, independently of the steering shaft.

8. In a device of the class described, a bearing bracket; a shaft journaled therein; a pinion on the shaft; a pinion rotatable on the bracket and meshing into the first specified pinion; projections upon the pinion of the bracket and upon the bracket; a resilient structure adapted to be mounted upon either projection; a lamp support; and mechanism for operatively connecting the resilient structure with the lamp support.

9. In a device of the class described, a steering shaft; intermeshing pinions, one of which is fixed on the shaft, the other of which is upheld for rotation independently of the shaft; projections, one of which is located upon the last specified pinion, the other of which is supported independently of said pinion; a resilient structure, adapted to be mounted upon either projection; a connection between the ends of the resilient structure; a pedal; a lamp support; means for uniting the pedal with one end of the connection; and means for operatively connecting the lamp support with the other end of the connection.

In testimony that I claim the foregoing as my own, I have hereto affixed my signature in the presence of two witnesses.

JOHN G. BECKER.

Witnesses:
L. R. MAHAR,
R. J. SMITH.

Copies of this patent may be obtained for five cents each, by addressing the "Commissioner of Patents, Washington, D. C."